March 5, 1968     J. A. SHROPSHIRE     3,371,468
BARRIER SEPARATOR
Original Filed April 23, 1964
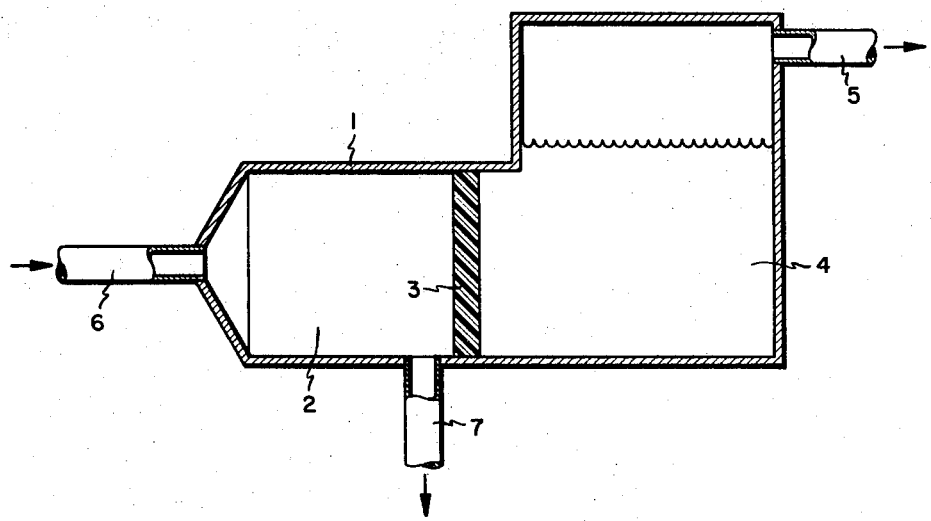
JOSEPH A. SHROPSHIRE    Inventor
By *Henry Berk*
Patent Attorney

United States Patent Office 3,371,468
Patented Mar. 5, 1968

3,371,468
BARRIER SEPARATOR
Joseph A. Shropshire, Westfield, N.J., assignor to Esso Research and Engineering Company, a corporation of Delaware
Continuation of application Ser. No. 362,007, Apr. 23, 1964. This application July 8, 1966, Ser. No. 563,923
3 Claims. (Cl. 55—158)

ABSTRACT OF THE DISCLOSURE

An apparatus comprising a gas-tight container separated into two chambers by a porous barrier made up of a particulate combination of hydrophobic polymers or waterproofed asbestos and hydrophilic material such as carbon, alumina, charred wood, paper, shredded paper, or plant fibers, one chamber of which is adapted to contain an aqueous inorganic acid base or salt solution or amino acids and one chamber adapted to contain a mixture of gases, has been found to accomplish a selective separation of gaseous mixtures.

---

This application is a continuation of application 362,007, filed Apr. 23, 1964, and now abandoned.

This invention is directed to an apparatus for separating and concentrating gases. In particular, this invention is directed to an apparatus for separating gaseous mixtures by means of a barrier separator in conjunction with a liquid wherein said separating means comprises a component which has no affinity for the liquid. More particularly, this invention deals with a means for separating and concentrating mixtures of gases by using a porous barrier separator which does not require elevated pressures, or temperatures, the separator means and the system for separating gases.

Heretofore, mixtures of gases were separable only by using extreme deviations from normal atmospheric pressure and ambient temperatures. Gases such as hydrogen could be separated from mixtures of hydrogen and other gases by using high temperatures and expensive noble metal diaphragms. All the methods heretofore used in the art have required expensive equipment and either high or low pressures or high or low temperatures, noble metal components or combinations of the three.

It has now been surprisingly found that gases may be separated from mixtures by using relatively inexpensive equipment at low temperatures and pressures. By using temperatures of about 200° C. and atmospheric pressure, hydrogen can be separated from mixtures in quantitative amounts. The process of the instant invention is accomplished by using a device comprising a porous barrier separating a gas chamber and a chamber filled with a liquid. Said barrier comprises a material which has no affinity for the liquid in the liquid chamber such as a hydrophobic material when the chamber contains either water or an aqueous solution. The mixture of gases to be separated is introduced into the gas chamber under normal atmospheric pressure or slightly higher pressures of about 1 to 5 atmospheres. By controlling the temperature and the particular liquid in the liquid chamber, various gases of the component system can be removed. By putting a number of these chambers in series, it is possible to remove a number of different gases from the mixture, or if the conditions throughout the plurality of chambers are the same then one component gas of the mixture can be removed.

The barrier used in this invention comprises a substance which can be "wetted" by the liquid and a material which cannot be "wetted" by the liquid. In the case of aqueous solutions, the materials which can be wetted by the liquid would include such materials as asbestos, finely divided porous materials such as carbon, ceramic, alumina, charred wood and cellulosic material such as paper, shredded wood and plant fibers. The materials which cannot be wetted by the liquid would include polymers of tetrafluoroethylene, dichlorodifluoroethylene, ethylene-propylene, ethylene-butylene, halogenated ethylene-propylene, ethylene-butylene, propylene-butylene, isopropylene-butylene and waterproofed asbestos. One method for waterproofing the asbestos is treating it with a chlorosilane.

Liquids which may be used in the separation system of this invention include acids such as $H_2SO_4$, $H_3PO_4$, HCl and aqueous solutions thereof, basic solutions such as NaOH, KOH, $K_2CO_3$, $Na_2CO_3$, and mixtures thereof and aqueous salt solutions with salts such as NaCl, KCl, $AlCl_3$, $CaCO_3$, $Cu(NO_3)_2$, $K_2CrO_4$, $K_2Cr_2O_7$, $KMnO_4$, $NaHSO_4$, $Na_2SO_4$, $MgSO_4$ and mixtures thereof and amino acids such as lysine, alanine, serine, phenylalanine, cystine, leucine, proline, tryptophane, glutamic acid and glycine.

In the practice of this invention, increased efficiency can be obtained by controlling the electrical potential across the barrier during the separation and purification process. In this case, the separator or barrier structure, of necessity, must contain a material which is electrically conductive, that is, material such as carbon and/or metal. The potential across the barrier or separator means is controlled with respect to another electrode member in the liquid by means of a potentiostat or similar device. Under particular conditions of temperature, selected gases will penetrate the barrier against the liquid head even at atmospheric pressure. This penetration under essentially no pressure driving force can be made even more selective and the penetration of the gases increased by adjusting the potential across the barrier by means of an external electrical power supply. The potential across the barrier can be adjusted so as to favor certain specific gases. For instance, the penetration of $H_2$ will be enhanced selectively if the barrier potential is maintained at about 0.0 volt vs. the reversible hydrogen electrode. Other gases have specific favorable potential values.

In the practice of this invention, the separation of the gaseous components can be more efficiently accomplished if a temperature gradient is maintained across the barrier separator. Such a procedure can be accomplished by maintaining a liquid on one side of the separator at a temperature different than that of the gaseous mixture of the opposite side of the separator. It is possible by adjusting the temperature gradient across the barrier separator to selectively separate gases from a mixture. The heating step need be used in conjunction with the particular liquid being employed. For example, if you wish to concentrate the gases from a mixture of gases such as a mixture comprising hydrogen, ethane and butane you could use a series of separators such as set forth in the drawing described herein so that in the first separator the liquid would be 30 wt. percent sulfuric acid at a temperature of about 60° C. Hydrogen gas is preferentially concentrated on the liquid side of the first separator. The mixture of gases wherein the amount of hydrogen has been decreased is led to the second separator which would comprise a liquid of aqueous $H_3PO_4$ at a temperature of 130° C. Ethane is preferentially concentrated on the liquid side of the second separator. The original mixture now consists essentially of butane. By utilizing a plurality of separators, a particular gas can be selectively purified from a mixture of a plurality of gases.

The efficiency of the separating means can further be increased if the structure contains a metal either singly or in combination with the substance which may be wetted by the liquid. Such metals include noble metals such as Pt, Ir, Au, Pd, Rh and mixtures of such metals or mixtures of said metals with transition metals such as Group VII and Group VIII. By adjusting these particular metals, hereinafter called "catalyst metals," a barrier can be made selective to certain gases.

The attached figure is a schematic view of a device for separating gases according to the process of this invention. The drawing is not to be construed as a limitation upon the design of the device for use with this invention. It is only for the purpose of illustration.

In the drawing, there is shown a gas tight, L-shaped container 1 which is divided by barrier 3 into two compartments, gas compartment 2 and liquid compartment 4 having a liquid therein, inlet means 6 for the introduction of the gas mixture into the gas compartment 2 and outlet means 5 and 7 for removing the gases from the system. In the practice of this invention, the mixture of gas is introduced through inlet 6 into the gas chamber 2. The particular gas to be separated passes through the barrier 3 into liquid compartment 4, forms bubbles in the liquid which rise to the surface of the liquid and then escape from the system through outlet 5. The mixture of gases entering through inlet 6 may be under atmospheric or slightly higher pressure. The separated gases which escape from the system through outlet 5 can be purified by condensing any liquid vapor carried from liquid compartment 4. By this process, substantially pure gases may be provided. In order to increase the purity figure can be connected such that the outlet of a first reactor is connected to the inlet of a second. A plurality of the separating devices can be used when connected in this manner in order to provide a selected gas in substantially pure form. In another embodiment of this invention, by using a plurality of devices such as set forth in the figure connected so that the outlet of the first device is connected to the inlet of the second device, it is possible to compress as selected gas while simultaneously purifying such selected gas. In this procedure the upper portion of chamber 4 would be cooled so as to condense and retain in chamber 4 the liquid utilized therein.

This invention is quite suitable for separating gaseous components such as hydrogen, gaseous organic compounds and inert gases such as He, Ne, A and Kr.

A particularly efficient barrier for the practice of this invention can be prepared as follows:

Finely divided carbon is impregnated with an aqueous solution containing platinum and iridium chlorides in amounts such that the ratio to platinum to iridium metal is about 7:1 and the total noble metal content represents about 6% of the total carbon and metal weight. After saturation, the excess water was driven off by heating the mixture to about 110° C. for 4 hours. The dried mixture was then treated with an aqueous solution of sodium borohydride (1 gm./10 cc.) to reduce all the noble metal chlorides present to the metal. The powder was then filtered and washed with distilled water several times and again dried at 110° C. The dried catalyzed powder was then placed under CO atmosphere at 420° C. for 3 hours and then under an $H_2$ atmosphere at about 870° C. for an additional 3 hours. The thus prepared catalyzed carbon powder was mixed with finely divided tetrafluoroethylene polymer and ammonium oxalate crystals in the weight ratio of 2:1:1, respectively, and mixed by ball milling for about 22 minutes. The mixture was then placed onto a suitable support at a pressure of between 5 to 15,000 p.s.i. followed by heating to 193° C. for 1 hour to decompose the ammonium oxalate thereby foraminating the structure. The structure thus prepared is very efficient for separating $H_2$ from a stream at atmospheric pressure at a temperature of about 60° C. Modifications of this barrier can be made by using different compounds of catalyst metals or by omitting the catalyst impregnation step of the carbon from the process of making the barrier.

Suitable supports for use in providing support for the barrier separating means of this invention include metallic wire screens such as tantalum, platinum, aluminum, silver, nickel and iron, and synthetic screens made from plastic catalysts such as tetrafluoroethylene polymer and polyethylene. The purpose of this support is to add stability and handling ease to the barrier separator device. However, if a potential gradient is to be maintained across the barrier separator, the support means must, of necessity, be electrically conductive.

The following examples are submitted for the purpose of illustration only and are not to be construed as a limitation upon the scope of the invention as set forth in the appended claims.

EXAMPLE 1

In order to test the operability of the instant invention, a device was constructed in accordance with the diagram of the figure. The barrier separator was made by mixing tetrafluoroethylene polymer, ammonium oxalate and fine carbon powder in the ratio of 1:0.5:1. The mixture was pressed at a pressure of 10,000 p.s.i. and then heated to a temperature of 190° C. in order to decompose the ammonium oxalate. This provided a porous structure consisting of hydrophobic and hydrophilic particles. The liquid utilized in the system was 30 wt. percent $H_2SO_4$ and the temperature of said liquid was maintained at 70° C. and a mixture of gases including hydrogen and ethane were admitted into the gas compartment. At these conditions, hydrogen was selectively concentrated on the liquid side of the barrier. The temperature was then elevated to about 130° to 140° C. with the $H_2SO_4$ being replaced by 85 wt. percent $H_3PO_4$. Under these conditions, ethane was preferentially concentrated in the liquid side of the system.

EXAMPLE 2

A device similar to that set forth in the drawing was made wherein the barrier separator was made by mixing finely divided carbon impregnated with 6 wt. percent of a Pt-Ir mixture with tetrafluoroethylene polymer and ammonium carbonate. The ratio of the carbon to tetrafluoroethylene polymer to ammonium carbonate is 2:1:0.5. The liquid used was 30 wt. percent sulfuric acid which was maintained at a temperature of about 80.3° C. When a mixture of gases containing hydrogen is admitted to the gas chamber, hydrogen is selectively concentrated on the liquid side of the system.

EXAMPLE 3

A barrier separator A was made by mixing two parts of finely divided carbon powder and one part tetrafluoroethylene polymer with one part ammonium oxalate, compacting the mixture at 10,000 p.s.i. on a 52-mesh tantalum screen and then slowly heating the compacted structure to a temperature of 193° C. for 132 minutes. A second structure B was made as the foregoing except that the finely divided carbon was impregnated with a 6 wt. percent solution of Pt-Ir. The finely divided carbon before being mixed with the tetrafluoroethylene was treated under a CO atmosphere at a temperature of about 420° C. and subsequently heated in a hydrogen atmosphere at a temperature of 800° C. These structures were tested as gas separating barriers and the results are set forth in Table I below.

TABLE I

| Gases Run | Barrier Separator | Electrolyte | Temp., °C. | Mole Ratio of Primary Gases | |
|---|---|---|---|---|---|
| | | | | Inlet | Outlet |
| $H_2/CO_2$ I | B | 30% $H_2SO_4$ | 80–90 | 1.14 | 1.93 |
| $H_2/CO_2$ II | B | $H_3PO_4$, 85% | 140 | 1 | 2.34 |
| $H_2/CO_2$ III | B | $H_3PO_4$, 85% | 340 | 0.87 | 2.2 |
| $H_2/C_2H_6$ I | B | $H_3PO_4$, 85% | 140 | 1.4 | 2.85 |
| $H_2/C_2H_6$ | B | $H_3PO_4$, 85% | 140 | 0.7 | 1.93 |
| $H_2/A$* | A | $H_3PO_4$, 85% | 140 | 1.24 | 1.95 |

*This structure of uncatalyzed (F.C. 30) carbon-tetrafluoroethylene polymer. All other were Pt-Ir on carbon.

A study of Table I indicated that the barrier does indeed selectively separate gases.

The term "barrier separator" as used in this invention is a descriptive term applied to a device which impedes the flow of a fluid and facilitates the efficient separation of one gas from a mixture of gases. Other terms which may be applied to such a device would be separator barrier, separation means or another term which is descriptive of a device which acts as both a barrier and separation means.

It is to be understood that the device of this invention as depicted by the figure can be modified by those skilled in the art without departing from the instant invention. Variations which are obvious and necessary when connecting a plurality of separating devices together would be such as adding a conduit for removing gases from chamber 2 of the figure. By adding such conduit, gases would enter through conduit 6 into chamber 2 and then be removed through the exit conduit, either to the atmosphere or to another separating device.

I claim:

1. An apparatus for effecting the separation of a mixture of gases which comprises a gas-tight container divided into a first and second chamber by means of a porous barrier separator, said first chamber having a gas inlet means and a gas outlet means and said second chamber having a gas outlet means and adapted to contain a liquid which covers said barrier separator, said barrier separator consisting of an intimate mixture of a member selected from the group consisting of particulate hydrophobic polymer and particulate waterproofed asbestos and a hydrophilic material selected from the group consisting of carbon, alumina, charred wood, paper, shredded wood, plant fibers, and mixtures thereof.

2. An apparatus as defined by claim 1 wherein said barrier separator consists of a foraminated mixture of finely divided carbon and finely divided tetrafluoroethylene polymer and said liquid comprises an aqueous inorganic acid.

3. The apparatus of claim 2 wherein the barrier contains, in addition, particulate metal selected from the group consisting of noble metals, transition metals and mixtures thereof.

References Cited
UNITED STATES PATENTS

| | | | |
|---|---|---|---|
| 2,835,343 | 5/1958 | Wolff et al. | 55—66 |
| 2,972,349 | 2/1961 | De Wall | 210—321 X |
| 3,130,156 | 4/1964 | Neff | 210—321 X |
| 3,208,883 | 9/1965 | Crouthamel et al. | 55—158 X |
| 3,244,763 | 4/1966 | Cahn. | |
| 3,228,394 | 1/1966 | Ayres. | |
| 3,266,629 | 8/1966 | Megibow | 210—321 |

SAMIH N. ZAHARNA, *Primary Examiner.*

REUBEN FRIEDMAN, *Examiner.*

J. ADEE, *Assistant Examiner.*